United States Patent [19]

Sugihara

[11] 4,163,997
[45] Aug. 7, 1979

[54] CASSETTE ACCEPTING AND EJECTING DEVICE

[75] Inventor: Masanori Sugihara, Tokyo, Japan

[73] Assignee: Beltek Corporation, Japan

[21] Appl. No.: 887,529

[22] Filed: Mar. 17, 1978

[30] Foreign Application Priority Data

Mar. 18, 1977 [JP] Japan .................................. 52/30081

[51] Int. Cl.² ...................... G11B 15/24; G11B 15/66
[52] U.S. Cl. .................................... 360/137; 360/96.5
[58] Field of Search ........................... 360/93, 96, 137

[56] References Cited

U.S. PATENT DOCUMENTS

| 3,893,184 | 7/1975 | Ishigami | 360/137 |
| 3,947,884 | 3/1976 | Yokota | 360/96 |
| 3,950,787 | 4/1976 | Hosaka | 360/137 |
| 3,957,225 | 5/1976 | Vogel | 360/96 |
| 3,984,871 | 10/1976 | Desai | 360/137 |
| 4,054,930 | 10/1977 | Terada | 360/96 |
| 4,071,860 | 1/1978 | Watanabe | 360/96 |

Primary Examiner—Jay P. Lucas
Attorney, Agent, or Firm—McGlew and Tuttle

[57] ABSTRACT

A container for receiving a cassette of a cassette tape player houses a movable plate which is adapted to be moved, compressing a spring, by the cassette as the latter is inserted. A container driving plate is provided for moving the container to the playing position by the force of a spring. A locking plate is so associated with the movable plate and the container driving plate that one of these plates is locked by the locking plate by the operation of the other, while the other is released from the locking plate. A slide plate is adapted to be held by a solenoid through a retaining member when the solenoid is energized. However, the slide plate is released as the solenoid is deenergized, so as to urge the movable plate, thereby to make the latter eject the cassette from the container. Thus, the slide plate corresponds to the eject lever in the conventional cassette loading and unloading device. It is remarkable that the ejection of the cassette can be effected by a slight force for depressing a switch for disenergizing the solenoid. This switch may be associated with a tape end detector such that the switch is operated to deenergize, the solenoid, thereby to effect the ejection of the cassette, when the tape has run to the end.

6 Claims, 7 Drawing Figures

CASSETTE ACCEPTING AND EJECTING DEVICE

BACKGROUND OF THE INVENTION

The present invention relates to a cassette loading and unloading device of a cassette tape recorder of a type in which the cassette is movable on the recorder between an insertion position and a playing position.

SUMMARY OF THE INVENTION

It is an object of the invention to provide a cassette loading and unloading device in which a small-sized solenoid is used such that the ejection of the cassette is made by an operation of a switch for deenergizing the solenoid, so that the ejection may be made with a small manual operation force and that the normal automatic ejecting operation, as well as the automatic operation in case of a trouble, may be facilitated.

It is another object of the invention to provide a cassette loading an unloading device in which the cassette is moved to the playing position only after the cassette is relieved from the manual insertion pressure, so that an operator's hand is not be drawn into the player with the cassette and so that the operator may be freed from the fear that his hand may be drawn into the player.

The cassette loading and unloading device of the invention is characterized by comprising a slide plate corresponding to the eject lever of conventional cassette loading and unloading devices and a solenoid. The slide plate is adapted to be preloaded by the insertion of the cassette, and is held by the solenoid so that the slide plate is released from the solenoid to effect the ejecting operation, when the solenoid is deenergized when a manually operable switch is operation or when a switch for detecting the terminal end of the tape is operated. Another feature of the cassette loading and unloading device of the invention resides in that a locking plate is provided for releasing one of a movable plate and a container driving plate by the movement of the other, the movable plate being adapted to be moved to load a spring during the insertion of the cassette, while the container driving plate is adapted to move the container to the playing position by the force of a spring.

Since the ejection of the cassette is effected in the device of the invention by operating a switch for deenergizing the solenoid, the switch can be used in place of the eject lever in the conventional cassette loading device, so as to allow the ejection of the cassette with a much reduced manual force as compared with the conventional device which requires a considerable manual force for operating the eject lever. At the same time, an automatic cassette ejecting operation is performed when the switch is combined with the switch for detecting the terminal end of the tape. If the switch for detecting the terminal end of the tape is of a type to detect the stop of rotation of the reel, the ejection of the cassette will be made also in case of troubles such as an entangling of the tape.

Further, since the solenoid in the device of the invention is not used for directly driving the ejecting member but for retaining and holding the slide plate which corresponds to the eject lever of the conventional device, and for facilitating the release of the slide plate, a small solenoid of small attracting force is sufficient, so that the size of the device and the power consumption are conveniently reduced.

Further, the locking plate is so arranged as not to allow the release of the container driving plate directly by the movement of the movable plate but to allow the release when the movable plate is moved back slightly, so that the container is allowed to be moved to the playing position only after the cassette is relieved from the manual insertion force, but not immediately after the insertion of the cassette. This arrangement is effective to prevent the operator's hand which is pressing the cassette from being accidentally drawn into the player, and to relieve the operator from the fear that his hand may be drawn into the player.

The other characteristics and advantages of the invention will become more clear from the following description of the preferred embodiment of the invention taken in conjunction with the accompanying drawings.

DESCRIPTION OF THE PREFERRED EMBODIMENTS

Figure 1:
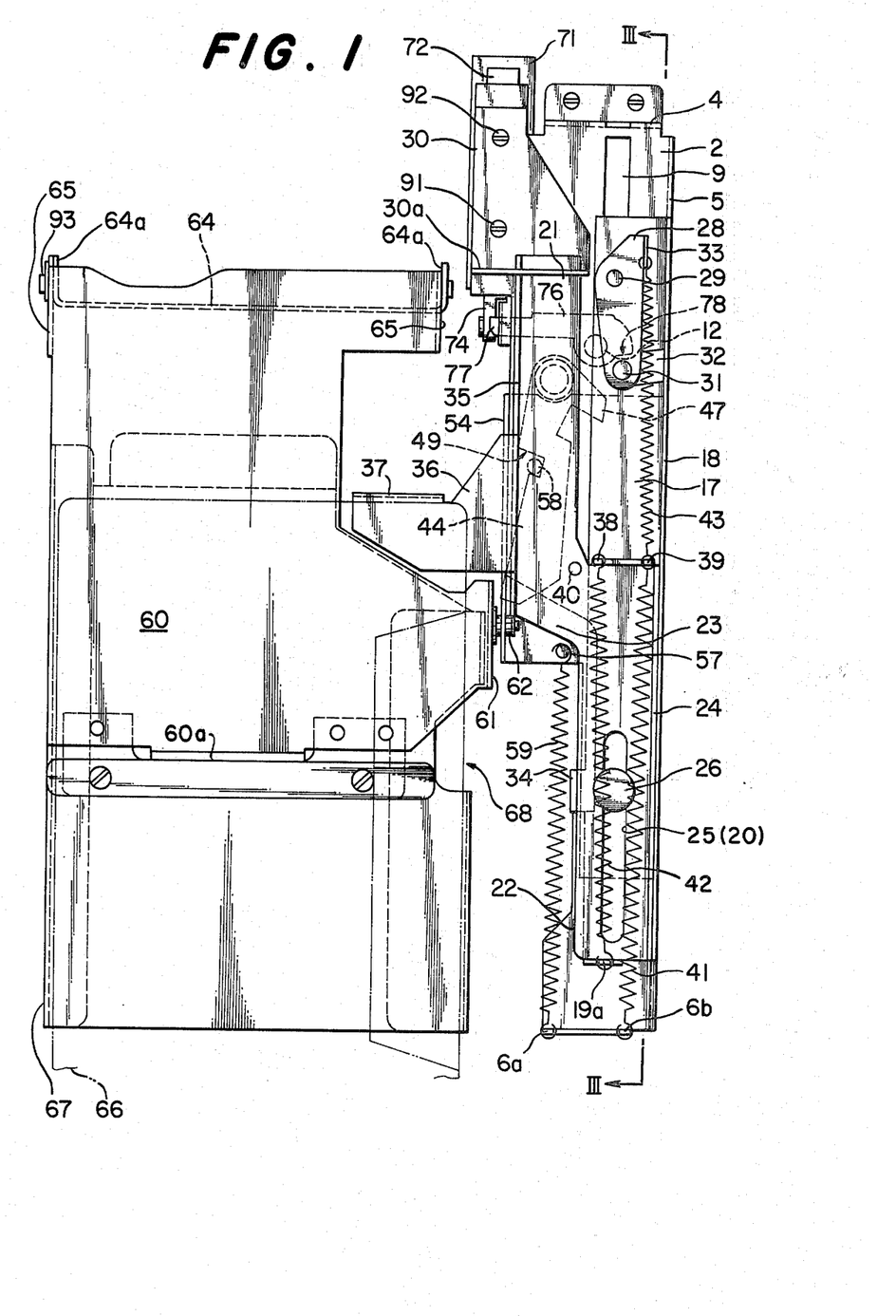
FIG. 1 is a plan view showing an embodiment of the invention.
Figure 2:
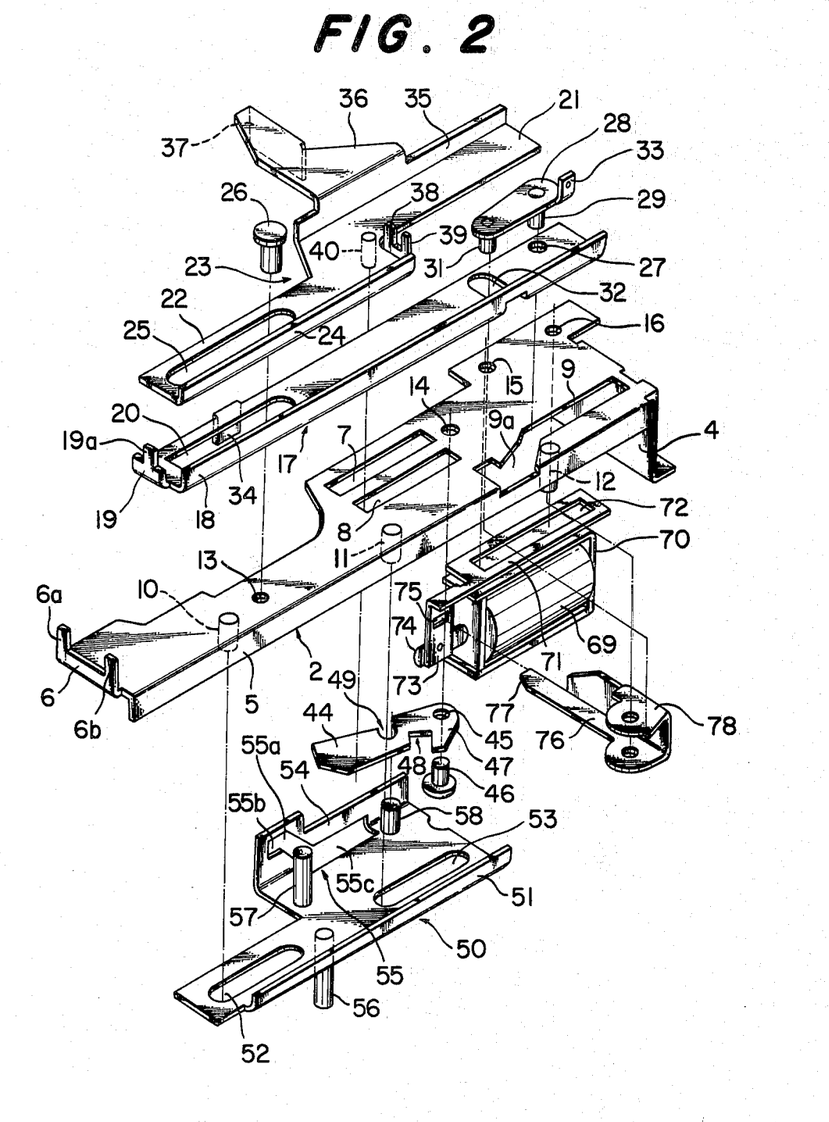
FIG. 2 is an exploded perspective view of an essential part of the embodiment as shown in FIG. 1.
Figure 3:
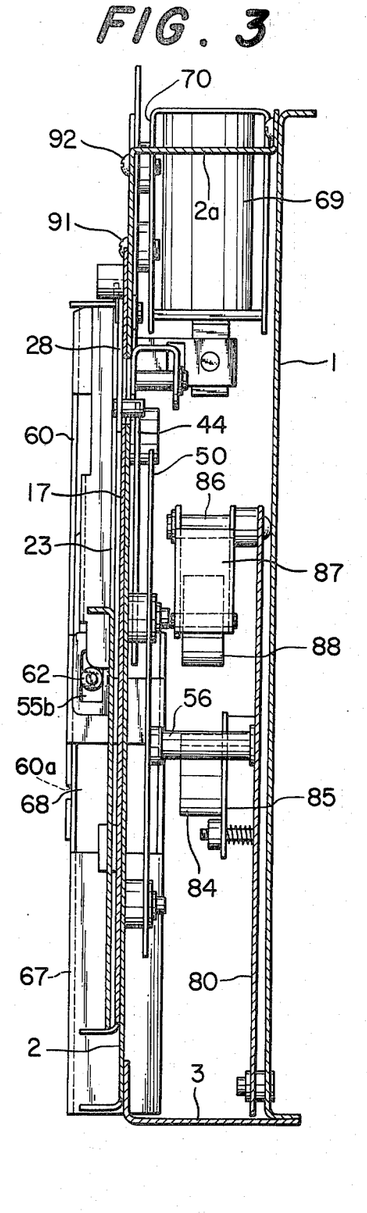
FIG. 3 is a sectional view taken along the line III—III of FIG. 1.

Referring first to FIGS. 1 to 3, an upper shelf 2 is secured to a base plate 1, with a suitable space left therebetween, through a bend 4 at its one end and an angle 3 fixed to its other end. The outer edge of the upper shelf 2 is bent toward the base plate 1, while the other end 6 of the upper shelf 2 is bent upward. Upwardly extending projections 6a, 6b are formed at both sides of the upwardly bent end 6. A longitudinal bore 7 and a parallel bore 8 are formed in the upper shelf 2 at a portion near the lengthwise center of the latter and closer to the side edge opposite to the bent edge 5. At the same time, an elongated slot 9 is formed to extend along the bent edge 5, in the upper shelf 2 at a portion of the latter close to the bent edge 4. The elongated bore 9 is so formed as to have a tapered side edge and a broadened end 9a closer to the lengthwise center of the upper shelf 2. The edge of the broadened end 9a thus reaches the bent edge 5 of the upper shelf 2.

Pillars 10, 11, as well as a shaft 12, are provided in the lower side of the upper shelf 2, at a portion of the latter closer to the bent edge 5. As will be seen from FIG. 2, a rounded bore 13 is formed in the vicinity of the pillar 10, while a rounded bore 14 is formed in the vicinity of one ends of the longitudinal bores 7, 8. Also, two rounded bores 15, 16 are formed in the upper shelf 2 at a portion of the latter opposite to the bent edge 5 and closer to the bent end 4.

A slide plate 17 has an upwardly bent outer edge 18 and an upwardly bent end 19, as well as an elongated bore 20 formed close to the end 19. The slide plate 17 is superimposed to the upper shelf 2 such that the bent edge 18 substantially align with the bent edge 5 of the upper shelf 2. A movable plate 23 consists of two longitudinal halves 21 and 22 which are unitary with each other and staggered laterally from each other by a distance substantially equal to their breadths. The movable plate 23 is superimposed on the slide plate 17 such that an upwardly turned edge 24 formed at one side of the half section 22 extends along the bent edge 18 of the slide plate 17.

The movable plate 23 has an elongated bore 25 of a shape substantially equal to that of the bore 20 of the slide plate 17, formed at a portion thereof corresponding to the bore 20.

A head-equipped rivet 26 loosely passes through these elongated bores 25, 20 and is fitted into the bore 13 of the upper shelf 2, while a shaft 29 of a locking lever 28, which loosely passes through a shaft bore 27 formed in the end of the slide plate opposite to the bent end 19, loosely passes through the elongated bore 9 of the upper shelf 2, so that the slide plate 17 is held for a free sliding movement within a stroke limited by these elongated bores 20 and 9.

The half section 21 of the movable plate 23 loosely passes through a bent tab 30a of an angle-like guide plate 30 (See FIG. 1) fixed to the upper shelf 2, so that the movable plate 23 is held for freesliding movement within a range limited by the elongated bore 25.

A pin 31 suspended from the free end of the locking lever 28 loosely passes through an elongated bore 32 formed in the slide plate 17 to extend in the breadthwise direction of the plate 17, and through the broadened end portion or locking lever catch portion 9a of the elongated bore 9 of the upper shelf 2. At the same time, an upwardly bent portion 33 is formed at one side of the base portion of the locking lever 28. An upwardly extending tab 19a is formed at the center of the bent end 19 of the slide plate 17, while a downwardly bent portion 34 is formed at the side of the slide plate opposite to the bent edge 18 and close to the bent end 19 of the slide plate. The inner edge 35 of the half section 21 of the movable plate 23 is bent upwardly, and a part 36 of the bent portion is further turned to extend horizontally. A part 37 of the turned portion 36 is further turned downwardly.

Two upward projections 38, 39 are formed at a portion of the movable plate 23 between the two halves 21, 22 and leading from the bent edge 24. A pin 40 is fixed to the lowersside of the movable plate 23, at a portion of the plate 23 close to the projections 38, 39. The pin 40 loosely passes through the elongated bore 8 of the upper shelf 2, so as to extend downwardly through the upper shelf 2.

As will be seen from FIG. 1, a spring 41 is stretched between the projection 6b formed at one end of the upper shelf 2 and the projection 39 of the movable plate 23, so as to bias the movable plate 23 toward the front, i.e. downwardly as viewed on FIG. 1. A strong spring 42 is stretched between the projection 19a at one end of the slide plate 17 and the projection 38 of the movable plate 23, while a weak spring 43 is stretched between the projection 39 of the movable plate 23 and the bent tab 33 of the locking lever 28, so as to bias the locking lever 28 clockwisely as viewed on FIG. 1. In the state, as shown in FIG. 1, the locking lever 28 is positioned at one end of its rotational stroke, where the pin 31 abuts the side edge of the broadened end 9a (See FIG. 2) of the elongated bore 9 of the upper shelf 2.

Figure 4:
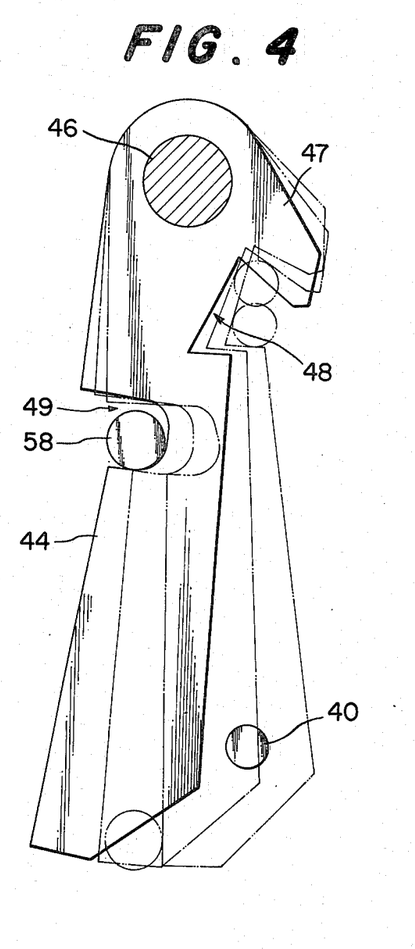
FIG. 4 is an enlarged explanatory plan view of the operation of a locking plate in the embodiment as shown in FIG. 1.

A locking plate 44 as shown in FIGS. 2 and 4 has a shaft bore 45 loosely passed by a headed shaft 46 which is fitted into the bore 14 of the upper shelf 2. Thus, the locking plate 44 is rotatably secured to the lower side of the upper shelf 2. The locking plate 44 is provided at one edge of the base portion thereof with a projection 47 and a first notch 48 leading from the projection 47, as well as a second notch 49 formed in the other edge. In the state as shown in FIG. 1, the right-hand side edge of the free end of the locking plate 44 assumes a position substantially parallel to the passage of the pin 40 of the movable plate 23, while the projection 47 of the locking plate 44 projects into the passage of the pin 40.

A container driving plate 50 has elongated bores 52, 53 formed along its one edge 51 thereof. The container driving plate 50 is slidably secured to the lower side of the upper shelf 2, so as to cover the locking plate 44 from the lower side, with its bores 10, 11 loosely receiving the pillars 52, 53, for free sliding movement in the longitudinal direction within a stroke limited by the elongated bores 52, 53. Although not shown, stopper rings are provided at the ends of respective pillars 10, 11, so as to prevent the container driving plate from being dropped.

The one and the other edges 51 54 of the container driving plate 50 are bent upwardly. The bent edge 51 extends along the inside of the bent edge 5 of the upper shelf 2, while the other bent edge 54 protrudes along the superimposed inner edges of the upper shelf 2, slide plate 17 and the movable plate 23.

A cam groove 55 consisting of tapered groove section 55a and horizontal sections 55b, 55c at both sides of the tapered section 55a is formed in the bent edge 54. A pin 56 is provided on the lower side of the container driving plate 50, while pins 57, 58 are provided at the upper side of the container driving plate 50. The container driving plate 50 is biased to slidingly move toward the front side, i.e. downwardly as viewed on FIG. 1, by means of a spring 59 stretched between the pin 57 and the projection 6a of the upper shelf 2. In the state as shown in FIG. 1, the container driving plate 50 has been to the end of its stroke, where the pin 58 is abutted by the inner side of the notch 49 of the locking plate 44 against further sliding movement.

A rocking plate 60 rotatably carried by a shaft 93 is disposed laterally of the foregoing members on the base plate 1. The rocking plate 60 has a bent edge 61 to which is fixed a pin 62 which loosely passes through the cam groove 55 of the container driving plate 50. A shaft 93 is supported by both bent ends 64a of a shaft supporting plate 64 which is fixed to a cut out tab 63 of the base plate 1, as will be seen from FIG. 7.

The shaft 93 loosely passes through the bent portion 65 formed at the base end of the rocking plate 60, so that the rocking plate 60 is pivotally secured to the base plate 1.

Figure 7:
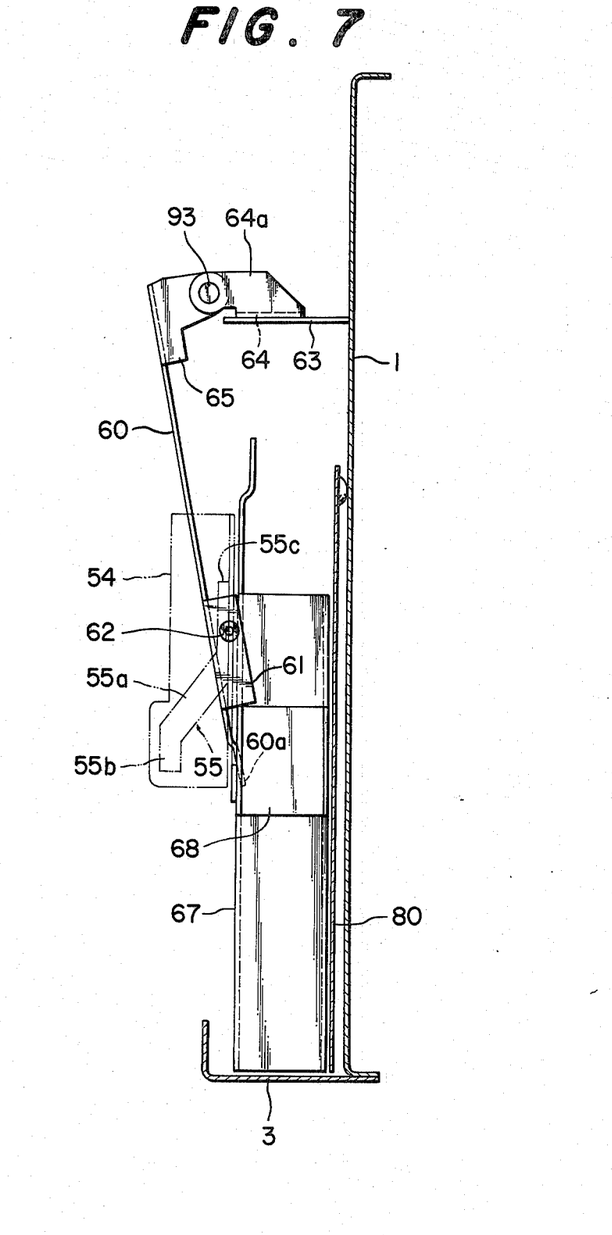
FIG. 7 is a sectional view similar to that of FIG. 3 showing only a container portion in the state of operation corresponding to FIG. 6.

A container 67 adapted to guide the loading of the cassette and to hold the same, is pivoted at its upper central section to the free end portion 60a of the rocking plate 60 by suitable means, as shown in FIGS. 1, 3 and 7.

The rocking plate 60 assumes a horizontal posture when the pin 62 of the rocking plate 60 engage the horizontal section 55b of the cam groove 55 as shown in FIG. 3. Also, the container 67 assumes a horizontal posture, floating slightly above the base plate 1. However, when the container driving plate 50 is slid forwardly by the biasing force of spring 59, the pin 62 of the rocking plate 60 is depressed by the tapered section 55a of the cam groove 55 and is moved to the lower horizontal section 55c, as shown in FIG. 7, so that the rocking plate 60 is swung toward the base plate 1. At the same time, the container 67 is moved toward the base plate 1, being guided by a suitable guiding means, so as to bring the cassette 66 held, by the container 67, to the playing position (FIG. 7).

Both side edges on the container 67 are bent and further turned inwardly to constitute a supporting frame for the cassette 66. Further, a window 68 for receiving a later mentioned magnetic head is formed in one side edge of the container 67.

At the innermost end of the container 67, the bent portion 37 of the movable plate 23 projects into the passage of the innermost end of the cassette 66 which is inserted into the container.

Screws 91, 92 are driven from the upper side through the rounded bores 15, 16 of the upper shelf 2 into a frame 70 of a solenoid 69, so as to fasten the solenoid 69 to the lower side of the upper shelf 2 beneath the rounded bores. A slide plate 71 interposed between the frame 70 and the upper shelf 2 has an elongated bore 72 loosely passed by the aforementioned screws 91, 92. The slide plate 71 is thus slidable in the longitudinal direction thereof. One edge 73 of the end portion of the slide plate 71 is bent downwardly and pivotally secured to a plunger 74 which is adapted to be attracted by the solenoid 69 when the latter is energized. An window 75 is formed in the slide plate 71 at a portion of the latter above the pivotally secured portion. The window 75 is loosely passed by the free end 77 of a second locking lever 76 which is rotatably carried by the shaft 12.

In the normal state as shown in FIG. 1, the pin 31 of the locking lever 28 is opposed by a step 78 formed on the base portion of the locking lever 76.

Figures 5, 6:
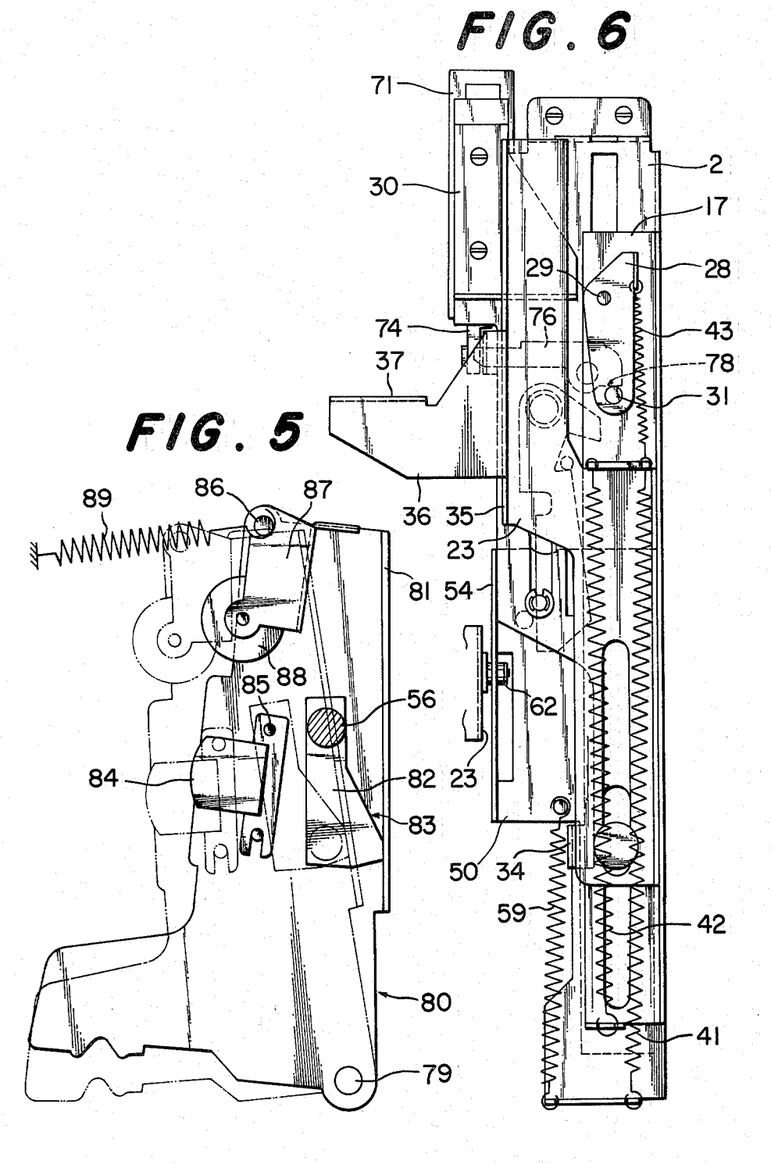
FIG. 5 is a plan view of a magnetic head portion of the embodiment as shown in FIG. 2.
FIG. 6 is a plan view showing the essential part in the different state of operation.

As shown in FIG. 5, a bell-crank-like head holding plate 80 adapted to be rotated around a shaft 79 is provided on the base plate 1. A cam groove 82 is formed along the bent edge 81 of the head holding plate 80. The cam groove 82 has a tapered side 83 so that the width of the cam groove 82 is gradually increased to reach the bent edge 81 as it gets closer to the front side, i.e. toward the lower side as viewed in FIG. 5.

A magnetic head 84 is held on the head holding plate 80, through a medium of a height adjusting plate 85 adapted to allow a fine adjustment of the height of the head on the head holding plate. At the same time, a rocking frame 87 is mounted for a rotation around a shaft 86 fixed to the free end portion of the head holding plate 80. A pinch roller 88 is rotatably carried by the free end of the rocking frame 87.

The head holding plate 80 is biased counter-clockwisely, by a spring 89 stretched between the shaft 86 and a suitable stationary part.

In the state as shown by full line in FIG. 5, the pin 56 suspended from the container driving plate 50 abuts one side of the upper half section of the cam groove 82 so as to keep the head holding plate 80 rotated against the biasing force. However, as the pin 56 is moved downwardly to get into the broadened portion of the cam groove 82, the head holding plate 80 is rotated counter-clockwise by the biasing force as shown by chain line, so as to bring the magnetic head 84 into contact with the tape in the cassette and, at the same time, to bring the pinch roller 88 into contact with a capstan (not shown) with the tape interposed therebetween.

However, the rocking frame 87 is previously mentioned for a clockwise rotation by a spring which is not shown, so that the pinch roller 88 may be pressed onto the capstan with a suitable pressure.

When the rocking plate 44 is positioned in the normal position as shown by full line in FIG. 4, the notch 49 of the rocking plate 44 stably engages the pin 58, because the notch 49 is so inclined as to have a slightly higher left-hand side end, so as to make the compression component of the pin 58 on the container driving plate 50 exerted by the spring 59 generate a clockwise rotation of the rocking plate 44.

In the illustrated embodiment, the retainer for the slide plate 17 is formed by the slide plate 71, first locking lever 28 and the second locking lever 76. However, this retainer may be formed suitably in different ways.

In loading the player with the cassette by means of the cassette loading and unloading device of the invention having the described construction, at first the cassette 66 is inserted through an insertion opening provided in the container 67 at the lower portion thereof as viewed in FIG. 1, until the innermost end surface comes into contact with the bent portion 37 of the movable plate 23. The cassette is further moved inward so that the movable plate 23 is moved inward loading the springs 41 and 42. It is assumed here that the solenoid 69 has been energized already, by a preceding turning on of a switch or by means of a switch which is adapted to be turned automatically by the insertion of the cassette 66. Therefore, the plunger 74 is attracted by the solenoid 69, so that the locking lever 76 is rotated through the slide plate 71 to assume the position as shown in FIG. 1, so that the step 78 of the locking lever 76 interrupts the passage of the pin 31 of the other locking lever 28, so as to prevent the slide plate 17 pivotally supporting the locking lever 28 from being moved. Consequently, only the movable plate 23 is moved as stated above.

As the movable plate 23 has been moved to the end of its stroke, the pin 40 of the movable plate 23 presses the projection 47 of the rocking plate 44, as shown by one-dot-and-chain line in FIG. 4, so as to swing the rocking plate 44 to the left. However, since the pin 40 engages the innermost corner of notch 48 of the rocking plate 44, the rocking plate 44 is stopped when it is rotated to a certain position. In this condition, the notch 49 of the rocking plate 44 is still in engagement with the pin 58 of the container driving plate. Although the rocking plate 44 is biased for counterclockwise rotation, i.e. in the direction opposite to the direction in which it has been biased, by a component of the force exerted by the pin 58 on the notch 49, the pin 40 effectively prevents the rocking plate 44 from being rotated.

Subsequently, as the cassette 66 is releaved of the pressing force, the movable plate 23 is moved back by the force of the springs 41 and 42. As the movable plate 23 is moved slightly back, so as to move the pin 40 away from the innermost corner of the notch 48 of the rocking plate 44, the rocking plate 44 is releaved of the pin 40 which has held the rocking plate 44 against rotation. Consequently, by the pressing component of the pin 58 acting on the notch 49, the rocking plate 44 is further rotated counter-clockwise, so as to release the pin 58 from the notch 49. At the same time, the pin 40 is retained by the front side corner of the notch 48, so as to prevent the movable plate 28 from being returned.

Consequently, the container driving plate 50 is slid toward the front side, by the resilient force of the spring 59, as shown in FIG. 6. In this state, the rocking plate 44 is biased for a rotation by the pressing component of the force exerted by the pin 40 on the notch 48 of the rocking plate. However, this rotation cannot take place because the left-hand side edge of the free end of the rocking plate 44 abuts the pin 58 of the container driving plate 50.

Since the container driving plate 50 has been slid forwardly in the manner as stated above, the pin 62 of the rocking plate 60 is pressed downward by the tapered groove section 55a of the cam groove 55 formed in the driving plate 50, so that the rocking plate 60 is swung to move the container 67 holding the cassette 66 in the direction perpendicular to the direction of insertion of the cassette, so as to bring the cassette 66 into the playing position (FIG. 7).

The tapered section 55a of the cam groove 55 is so selected that the stroke of the container 67 is performed by the earlier half of the movement of the container driving plate 50. In the later half of the movement of the driving plate 50, the pin 56 suspended from the latter comes to be positioned on the tapered edge 83 of the cam groove 82 of the head holding plate 80, so as to allow plate 80 to be rotated counter-clockwise by the biasing force of spring 89. At the end of the stroke of container driving plate 50, the magnetic head 84 and the pinch roller 88 come to assume respective playing positions. Thus, the magnetic head 84 and the pinch roller 88 are moved to the playing positions only after the cassette is moved to the playing position, so that the movement of the magnetic head 84 is never interrupted.

For ejecting the cassette from the playing position, the solenoid 69 is deenergized by means of a manually operable switch or automatically through a means for detecting the arrival of the end of the tape. Consequently, the plunger 74 and the locking lever 76 are freed. Then, the locking lever 76 is rotated into the pin 31 of the first locking lever 28, by the force stored in the spring 42 attached to the slide plare 17, so that the step 78 of the locking lever is inclined to allow the slipping of the pin 31.

Consequently, the pin 31 is disengaged from the step 78, so as to allow the sliding movement of the slide plate 17 by the spring 42.

At an intermediate portion of the sliding movement of the sliding plate 17, the locking lever 28 is rotated counter-clockwise as view on FIG. 6, against the biasing force exerted by the spring 43, by the compression component of the force exerted by the pin 31 on the step 78 of the locking lever 76 which has been rotated. The locking lever 28 is finally moved, accompanying the sliding movement of the slide plate 17, to the innermost side of the locking lever 76, riding over the side edge portion of the locking lever 76.

Since the force of the spring 42 is selected considerably larger than that of the spring 59, the bent portion 34 arrests the container driving plate 50 to bring the latter inwardly, overcoming the spring 59, when the slide plate 17 is moved inward as stated above. Therefore, the pin 56 of the driving plate 50 presses the inclined edge of the cam groove 82 of the head holding plate 80, so as to reset the latter against the biasing force, thereby to move the magnetic head 84 and the pinch roller 88 away from the cassette. Then, the pin 62 of the rocking plate 60 is moved upward by the tapered section 55a of the cam groove 55 of the container driving plate 50, so as to cause a rocking movement of the rocking plate 60, thereby to reset the container 67.

Then, as the container driving plate 50 has moved to the end of its stroke, the pin 58 is positioned to confront the notch 49 of the locking plate 44 of the pin 58. Consequently, the locking plate 44 is rotated clockwise as viewed on FIG. 4, by the pressing component of the force exerted by the pin 40 of the movable plate 23 on the front side step of the notch 48 of the locking plate 44, so that the pin 58 comes to be held by the notch 49, while the pin 40 is relieved from the notch 48, thereby to allow the spring 41 to reset the movable plate 23. In addition, when the pin 40 is disengaged from the notch 48, the pin 40 presses the side edge of the locking plate 44, so as to further rotate the locking plate to the starting position as shown by full line in FIG. 4.

During the resetting movement of the movable plate 23, the front side end of the movable plate 23 presses the bent end 19 of the slide plate 17, so as to move the latter 17 unitarily therewith toward the front side, while the bent portion 23 of the movable plate 37 forces the cassette 66 outwardly, so that all members are brought back to the starting condition as shown in FIG. 1. The pin 31 of the locking lever 28 rides over the side of the locking lever 76 and is moved to the front side of the step 78 of the lever 76, i.e. to the starting position as shown in FIG. 1.

It is important that the cassette is inserted with the solenoid 69 kept not energized, because of an electric failure or because the operator forgets to turn the source switch on. In such a case, the operator will not notice the fact that the solenoid is not energized, if the cassette can be inserted in the usual manner, and will try to operate the player for the playing back or leave the player unstarted with the cassette inserted in the latter.

However, according to the invention, the cassette 66 cannot assume the playing position if the latter is inserted when the solenoid 69 is not energized, as will be seen from the following description.

Namely, in such a case, although the movable plate 23 is moved inward compressing and loading the springs 41, 42 as stated before, the locking lever 76 is rotated through the pin 31 of the locking lever 28, by the sliding tendency of the slide plate 17, because the plunger 74 is kept for free movement and because the locking lever 76 is allowed to rotate. Therefore, the step 78 is inclined to facilitate the disengagement of the pin 31 therefrom. As the movable plate is further moved, the resilient force of the spring 42 is increased to overcome the biasing force of the spring 43, so as to allow the pin 31 to be disengaged from the step 78. Consequently, the locking lever 28 is rotated overcoming the biasing force, and the pin 31 rides over the side edge of the locking lever 76, rotating the locking lever 28 against the biasing force, thereby to allow the sliding movement of the slide plate 17. The slide plate is therefore slided inwardly, by the force accumulated in the spring 42. Consequently, the locking plate 44 is rotated by the pin 40 of the movable plate 23. Therefore, in spite of the disengagement of the locking plate from the pin 58, the container driving plate 50 is never moved by the resilient force of the spring 59, because the bent portion 34 of the slide plate 17 abuts the container driving plate 50. The container 67 and the cassette received by the latter are therefore prevented from being moved to the playing position.

As the cassette is releaved from the insertion pressure, the locking plate 44 is rotated clockwise as viewed on FIG. 1, by the component of the resetting force of the pin 40 of the movable plate 23. Consequently, the movable plate 23 and the slide plate 17 are unitarily returned to the position as shown in FIG. 1, with the pin 58 entrapped by the notch 49 of the locking plate 44, so that the cassette 66 is ejected.

For information, the slide plate 17 is a member corresponding to the eject lever in the conventional device.

As has been explained, according to the invention, the operator can be aware that the player is not ready for operation, when the solenoid is not energized, because the player cannot be loaded with the cassette in such a case, and can take necessary step for correctly putting the player into operation. At the same time, it is conveniently avoided that the operator leaves the player with the cassette inserted.

In case of a player mounted on an automobile, it is often experienced that the power is turned off by the pulling out of the engine key, while the cassette is held in the player. In such a case, the pinch roller is apt to be deformed to cause an irregular tape feeding, if the cartridge is left on the player. However, the described embodiment of the invention is entirely free from this problem, because the solenoid 69 is disenergized to cause the eject of the cartridge in the described manner, even when the power supply is interrupted during playback.

Further, in the illustrated embodiment of the invention, the operator's hand is never drawn into the cassette insertion opening accidentally, and the operator is freed from the fear that his hand may be drawn into the player, because the cassette is allowed to be moved only after the cassette is released from the manual insertion force, subsequent to the insertion to the innermost position on the container. However, such a safety function is not essential in the present invention. Namely, the locking plate 44 may be constructed to release the pin 58 immediately after is rotated by the pin 40, so that the cassette may be moved to the playing position as soon as it is inserted.

Following advantages are derived from the present invention.

(1) According to the invention, the slide plate 17, which correspond to the eject lever of the conventional device, is preloaded as a result of the insertion of the cassette, and is retained by the attracting force of the solenoid. As the switch for disenergizing the solenoid is operated, the slide plate is released to cause the ejection of the cassette. Thus, the ejecting operation can be effected with a much reduced force for operating the switch. In addition, the ejecting button can be located at any desired position on the player, even at a position remote from the player for a remote control. Further, since the sole function of the solenoid is to merely hold the slide plate 17, a small solenoid having a weak attracting force can be used as the solenoid in the device of the invention. This contribute to reduce the size of the whole structure of the device, as well as the power consumption.

(2) The members constituting the device of the invention can be mounted in a stacked manner in the space above the magnetic head. At the same time, the loading and unloading device of the invention can be built up as an independent block, so as to contribute to minimize the size of the player and to allow a swift assembling.

(3) The player can be turned into operation simply by a single action of inserting the cassette, if the power source switch is arranged to be turned on by the insertion of the cassette.

(4) A reliable automatic ejecting device can easily be constructed by interlocking the device with an automatic switch which is adapted to be actuated upon detection of the arrival of the tape end, because the ejection of the cassette is effected simply by disenergizing the solenoid.

(5) The strokes of movements of the movable plate and the container driving plate can be selected sufficiently long, because the ejecting operation do not rely upon a mechanical manually operable ejecting member. Also, the slopes of cam parts are made gentle to reduce the forces required for the cassette insertion and ejection.

While specific embodiments of the invention have been shown and described in detail to illustrate the application of the principles of the invention, it will be understood that the invention may be embodied otherwise without departing from such principles.

What is claimed is:

1. A cassette loading and unloading device comprising: a container (67) adapted to hold a cassette; a movable plate (23) adapted to be moved loading a spring (41) as said cassette is inserted; a container driving plate (50) engaging said container and adapted to move said container to a playing position by the force of a spring (59); a locking plate (44) pivotally mounted adjacent said container driving plate, said movable plate and said container driving plate being adapted to be selectively retained by a pivoting of said locking plate, one of said movable plate and container driving plate being released from said locking plate; and a slide plate (17) adapted to be prevented from moving when held through a retaining member (28) upon energization of a solenoid (69) and to be allowed to move when said solenoid is denergized, said slide plate being biased by a spring (42) so as to cooperate with said container driving plate when moved forwardly and with said movable plate when moved backwardly, said locking plate being pivotally supported for free rocking movement, and provided at its one end with a projection (47) and a notch (48) leading from said projection and at the other end with a notch (49), said notch (49) being adapted to stably arrest and hold a pin 58 of said container driving plate biased by said spring (59), said projection (47) being adapted to be pressed by a pin (40) provided on said movable plate when said movable plate is moved as a result of the insertion of the cassette, said locking plate (44) being adapted to be further rotated when the cassette is released from the insertion force, so as to release said container driving plate and so as to hold said movable plate.

2. A cassette loading and unloading device as claimed in claim 1, wherein said movable plate, said container driving plate, said locking plate and said slide plate are superimposed with an upper shelf suitably interposed, so as to form an independent block which is easy to mount on and dismount from the main body of a player.

3. A cassette loading and unloading device according to claim 1, wherein said slide plate (17) pivotally supports a locking lever (28) biased in a locking direction to retain said slide plate, said slide plate being connected to said movable plate (23) by means of said spring (42) and having a bent portion (34) for sliding along and guiding said container driving plate (50).

4. A cassette loading and unloading device according to claim 1, further including means for controlling the movement of said movable plate (50), said means including said solenoid and a locking lever (76), said locking lever being pivotable for free rocking movement and connected at one end to said solenoid, said locking lever (76) having a step (78) formed at its other end opposed to a pin (31) of said locking lever (28) provided on said slide plate (17).

5. A cassette accepting and rejecting device for a cassette player comprising:

- a stationary upper sheld (2) with an elongated slot (9) having a locking lever catch portion (9a);
- a slide plate (17) slidably engaged with said stationary upper shelf (2) having a portion (34) extending therefrom;
- a first locking lever (28) pivotally mounted on said sliding plate (17) having a pin (31) engageable in said locking lever catch portion (9a) to hold said slide plate in a forward position with respect to said upper shelf;
- a movable plate (23) slidably engaged with said upper shelf having a portion (37) engageable with a cassette that is moved with force into the player to move the movable plate (23), said movable plate (23) having a pin (40) extending therefrom;
- a locking plate (44) pivotally mounted on said upper shelf having a projection (47), a first notch (48) adjacent said projection (47) and a second notch (49), said pin (40) of said movable plate being movable against said projection (47) to pivot said locking plate as the cassette is moved with force into the player, said pin (40) being movable into said first notch (48) to further pivot said locking plate when the cassette is released from the force;
- a driving plate (50) slidably engaged with said upper shelf having a cam groove (55) and a pin (58), said pin (58) disposed in said second notch (49) as the cassette is moved with force into the player to retain said driving plate in a non-playing position, and out of said second notch (49) when the force on the cassette is released and the locking plate pivots further to release said driving plate to allow it to move to a playing position;
- said portion (34) of said slide plate (17) engageable with said driving plate to return said driving plate to its non-playing position;
- a solenoid (69) connected to said upper shelf having a plunger (74);
- a second locking lever (78) pivotably mounted on said upper shelf and pivotable by said plunger (74), said locking lever having a portion engageable with said pin (31) of said first locking lever (28) to hold said pin (31) when said solenoid is energized and to release said pin (31) when said solenoid is deenergized and permit said first locking lever (28) to pivot and remove said pin (31) from said lever catch portion (9a);
- a spring (43) connected between said first locking lever (28) and said movable plate (23) to bias said first lever in a direction to engage said pin (31) into said catch portion (9a); a strong spring (42) connected between said slide plate (17) and said movable plate (23) to bias said slide plate in a direction away from said forward position of said slide plate;
- a spring (41) connected between said upper shelf and said movable plate (23) to bias said movable plate in a direction against the force of the moved cassette;
- a spring (59) connected between said upper shelf and said driving plate (50) biasing said driving plate toward its playing position; and
- a rocking plate with cassette container (60, 67) having a portion engaged into said cam groove (55) of said driving plate (50) for receiving the cassette moved with force and for displacing the cassette into a playing position when said driving plate (50) is moved to its playing position.

6. A device according to claim 5, further including a magnetic head holder (80) pivotally mounted in the player having a cam groove (83); a magnetic head holder actuating pin (56) connected to said driving plate (50) for pivoting said magnetic head holder (80) toward a cassette in said rocking plate and cassette container when said rocking plate and cassette container is moved to its playing position.

* * * * *